(No Model.)
E. E. GLIDDEN.
LANTERN.
No. 424,289. Patented Mar. 25, 1890.
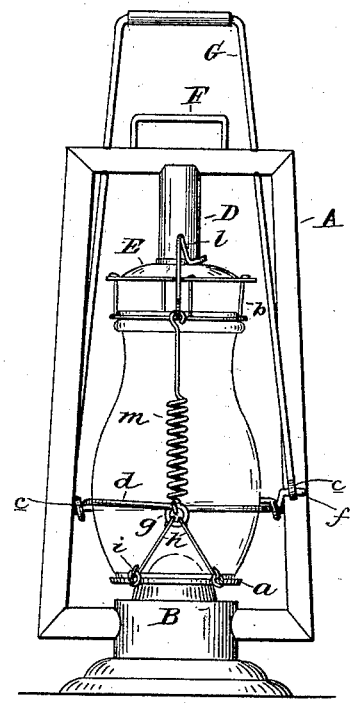
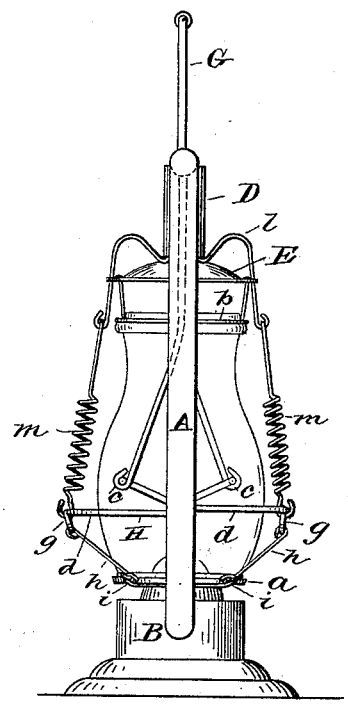
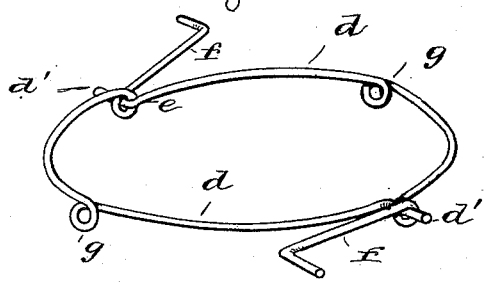
Witnesses
H. D. Nealy.
J. W. Fowler.
Inventor
Edmond E. Glidden,
By his Attorneys
A. H. Evans & Co.

UNITED STATES PATENT OFFICE.

EDMOND ELLIS GLIDDEN, OF WEST OLDTOWN, MAINE.

LANTERN.

SPECIFICATION forming part of Letters Patent No. 424,289, dated March 25, 1890.

Application filed April 29, 1889. Serial No. 309,026. (No model.)

*To all whom it may concern:*

Be it known that I, EDMOND ELLIS GLIDDEN, a citizen of the United States, residing at West Oldtown, in the county of Penobscot and State of Maine, have invented certain new and useful Improvements in Lanterns, of which the following is a full and clear description, reference being had to the accompanying drawings, forming part of this specification, in which—

Figure 1 is a front elevation of a lantern embodying my invention. Fig. 2 is a side elevation of the same. Fig. 3 is a detail to be referred to.

My invention relates to certain new and useful improvements in lanterns; and it consists in the constructions and combinations of devices which I shall hereinafter fully describe and claim.

To enable others skilled in the art to make and use my invention, I will now describe its construction and indicate the manner in which the same is carried out.

In the said drawings, A represents any well-known form of frame suitable for holding the lamp and burner and other parts of the lantern, and B is the lamp, supported on the lower cross-bar of the frame in any manner to permit its removal for cleaning and refilling. The lamp globe or chimney is suspended over the lamp and has its bottom closed by a plate or disk $a$, provided with a central opening to receive the burner of the lamp.

The main frame A has a tube or bar D projecting downwardly and serving as a means for guiding the movements of a cap piece or disk E, which is supported above the top of the globe by a light wire frame $b$.

The main frame is provided with a bail or handle F, and through the top bar of said frame passes the two ends of a bent rod or bar G, whose lower ends are bent in opposite directions and formed or provided with eyes $c$, as shown more particularly in Fig. 2.

A wire or other frame H surrounds the lower part of the globe, and consists of two independent curved wires or bars $d$, each of which has one of its ends formed with a short pintle $d'$, which is journaled in the sides of the main frame, while the opposite end is coiled to form an eye $e$, and then extended at $f$ beyond the main frame and formed with a pintle, which is journaled in the eyes formed in the lower ends of the rod or handle G.

It will thus be seen that each portion or section of the frame H has a pintle which passes through the eye $e$, formed in the other section at the opposite side of the main frame, and that the extended portions $f$ project in opposite directions and engage the oppositely-extending portions of the rod or handle G.

In addition to the features above noted the sections of the frame H are formed with eyes $g$ near their central portions, and these eyes are engaged by the upper ends of rods $h$, whose lower ends engage eyes $i$, formed on the lower or bottom plate $a$, whereby said plate is held in place against the bottom of the globe and a connection formed between the frame H and the globe. The cap-piece D is also engaged by a bail or wire $l$, which passes over its top and has its lower ends attached to springs $m$, whose lower ends are in turn attached to the sections of the frame H at the eye portions $g$, whereby the cap-piece is securely held in place and the globe held in an elevated or lowered position.

To operate the device, the handle or rod G is forced downward, and the lower ends of this rod being connected with the extended portions of the sections of the wire frame H these sections are caused to turn on their pintles $d'$, whereby the globe is caused to move in a direction opposite to the directions of the handle or rod; or, in other words, the globe is caused to rise above the lower bar of the main frame to permit access to the lamp. The lamp may now be lighted without delay or the inconvenience attending the lighting of lanterns in windy weather, as the lamp need not be removed from its seat on the main frame, but the globe simply raised and automatically held by the springs above the lamp-burner to expose the wick. After the lamp is lighted the operator pulls the handle or rod G upward, which causes the globe to be lowered onto the lamp and to be held thereon by its own weight. The frame H, in addition to the functions already ascribed to it, also serves as a shield for the globe and protects the latter from accidental breakage.

Having thus described my invention, what

I claim as new, and desire to secure by Letters Patent, is—

1. The main frame, the lamp, and the globe, in combination with a wire frame surrounding the globe, said frame consisting of two connected sections having pintles journaled in the main frame and provided with extended lever portions, and a sliding handle connected with said lever portions and raising and lowering the globe, substantially as described.

2. The combination of the main frame, the lamp and globe therein, a wire frame H, surrounding the globe and having pintles journaled in the main frame and the oppositely-extending lever portions, a sliding handle having oppositely-extending lower ends connected with the lever portions of the frame H, a plate for the bottom of the globe and connected with the wire frame, a cap above the globe, and a spring-connection between the cap and frame H, substantially as described.

EDMOND ELLIS GLIDDEN.

Witnesses:
WILLIS M. PORTER,
LAURA G. BATES.